Jan. 1, 1952
H. L. MORRISON
POLARITY-SWITCHING OUTPUT CIRCUIT
FOR WIDE-BAND VIDEO AMPLIFIERS
Filed Feb. 18, 1949
2,580,941
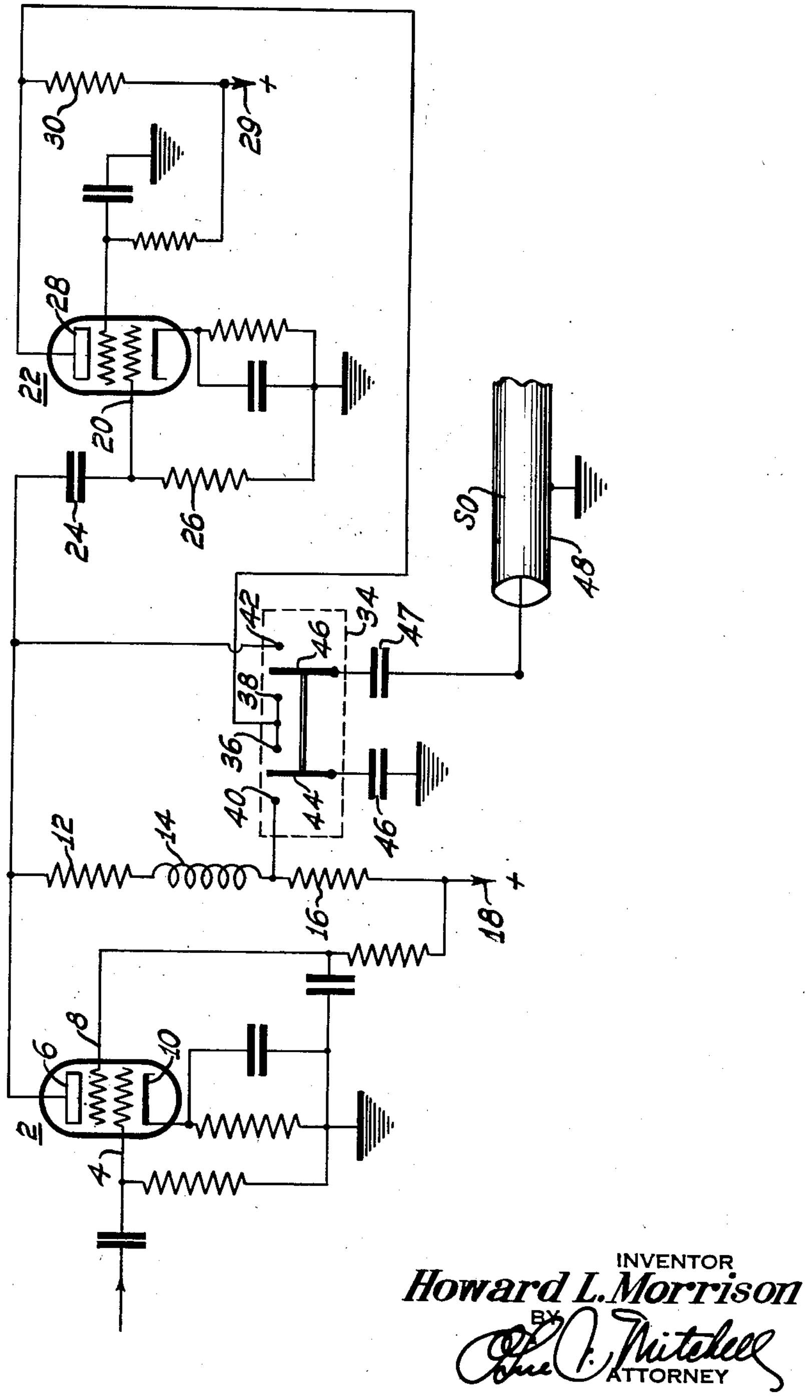
INVENTOR
*Howard L. Morrison*
BY
ATTORNEY Patented Jan. 1, 1952

2,580,941

UNITED STATES PATENT OFFICE 2,580,941

POLARITY-SWITCHING OUTPUT CIRCUIT FOR WIDE-BAND VIDEO AMPLIFIERS

Howard L. Morrison, Boise, Idaho, assignor to Radio Corporation of America, a corporation of Delaware Application February 18, 1949, Serial No. 77,082

4 Claims. (Cl. 179—171)

This invention relates to a polarity reversing circuit that is especially useful in connection with wide-band video amplifiers.

Rectangular waves can be thought of as being composed of a fundamental frequency together with a great number of harmonics; and television reproduction normally requires circuits that are free from amplitude and phase discrimination over a frequency band of 60 cycles to 4.5 megacycles, or higher for color television. Under circumstances when the shape of video waveforms is to be retained with a high degree of fidelity, it is necessary to provide circuits that pass a band of frequencies from 2 cycles to 15 megacycles. Such a circuit is necessary, for example, to faithfully reproduce sixty-cycle rectangular waves. Therefore, when the waves are to be reversed in polarity as well as amplified, the performance requirements placed on the reversing circuit are extremely high. Among the necessary characteristics are the following:

In order that the frequency characteristics of the circuits prior to the polarity reversing circuit may not be affected, it is necessary that the input impedance of the reversing circuit be identical regardless of which polarity is selected. If the first tube is a tetrode, pentode, or beam power tube this means that the control grid or cathode circuits must not be disturbed.

It is easily seen that if the waves are to be transmitted with equal fidelity in either polarity, the reversing circuit must have the same frequency response characteristics in either polarity.

A further requirement is that the amplitude of the rectangular waves of opposite polarities be the same and it is desirable to accomplish this without sacrifice of gain.

It is necessary also that the internal impedance be equal for either polarity in order that the change in amplitude and phase be identical.

Finally it is usually required that direct current be prevented from reaching the load.

Conventionally, reversal of polarity is accomplished by changing the connection of the load from the cathode to the plate circuit. Naturally, when the load is connected to the cathode, the input impedance of the tube is changed with the consequent adverse results noted above. This can be overcome by placing a dummy load across the cathode resistor when the load is connected to the plate circuit, but this reduces the available gain. Also, with such an arrangement, it will be found very difficult to obtain equal frequency response characteristics for the two polarities.

These inadequacies are overcome in this invention by providing two amplifiers in tandem and connecting the load to the first amplifier to obtain signals of one polarity and connecting the load to the output of the second amplifier, while reducing the gain of the first to unity, for obtaining signals of the opposite polarity.

An advantage in this system is that a blocking condenser of a much lower capacitance value can be used than is possible with the polarity-reversing circuits of the prior art, which involve a cathode-output circuit.

Accordingly one purpose of this invention is to provide a polarity reversing circuit having the same input impedance for either polarity of output.

Another purpose of this invention is to provide a polarity reversing circuit having identical frequency response characteristics for either polarity of output.

A still further object is to provide a circuit whereby the polarity of signals can be reversed without a change in amplitude between the two polarities, or loss in overall gain.

Further objects and advantages will appear from a consideration of the drawing which shows by circuit diagram one form of this invention.

In the drawing numeral 2 indicates a beam power or pentode amplifier having a control grid 4, a plate 6, a screen grid 8 and a cathode 10. The plate load circuit comprises a small resistor 12, a peaking inductance 14 and a large resistance 16 connected in that order between the plate 6 and a source of positive potential 18. The output of amplifier 2 derived at plate 6 is coupled in conventional manner to the grid 20 of a similar amplifier 22 by coupling condenser 24 and grid leak resistor 26. Plate 28 of the amplifier is connected to a source 29 of positive potential via a resistor 30 that is of the same order of magnitude as resistor 16 which is in the plate circuit of amplifier 2.

Switch 34 is a double-pole, double-throw switch having common contacts 36 and 38 connected to plate 28 of the amplifier 22, a contact 40 connected to the junction between peaking inductance 14 and plate load resistor 16, and a fourth contact 42 connected directly to the plate 6 of amplifier 2. The moveable contacts 44 and 46 are ganged together, the former operating in conjunction with contacts 40 and 36, and the latter in conjunction with contacts 38 and 42. Condenser 46 is connected between moveable contact 44 and ground and condenser 47 couples the moveable contact 46 to the load which generally is a coaxial cable such as indicated by 48, the outside sheath 50 being grounded.

To obtain an output of a reverse polarity the contact members are moved to the right as shown in the drawing in order that the load is connected to the plate 6 of amplifier 2 via condenser 47, and condenser 46 is connected between the plate 28 of amplifier 22 and ground. If the direct-current blocking condenser 47 has a reactance that is low in comparison with the value of resistor 16, the effective alternating-current plate load is practically equal to the reactance of condenser 47 and the characteristic impedance of the coaxial cable 50 in series, the direct-current plate load not being affected.

Because amplifier 2 is a beam power or pentode amplifier, it exhibits constant-current-generator characteristics, and the output voltage which is developed across the terminated coaxial cable is not affected by the reactance of condenser 47, because the said output voltage is the product of the alternating-current component of the plate current of tube 2 and the termination resistance of the coaxial cable. Because the reactance of condenser 47 is low with respect to resistor 16, the variation in the reactance of condenser 47 with respect to variation in frequency has practically zero effect on the output current and voltage. Condenser 46 shunts the output of amplifier 22 to ground so as to prevent any adverse effect that might otherwise be produced by reaction upon the grid 20 by signals in the plate circuit 28.

Because the value of the reactance of condenser 47 need only be small in comparison with the large resistor 16, its capacitance can be much smaller than that of a coupling capacitor used in a cathode output circuit, for the reactance of the coupling capacitor in such a circuit must be much smaller than the characteristic impedance of the coaxial cable.

Upon moving switch 34 to the left, the load is connected to the plate 28 of amplifier 22 and condenser 46 is now connected so as to provide a bypass across resistor 16 for the lowest frequencies to be transmitted.

Because resistor 30 is the same order of magnitude as resistor 16, the change in reactance of condenser 47 with respect to change in frequency has practically zero effect on the output voltage, which is developed across the termination of the coaxial cable, for the same reasons as previously enumerated. The output is now of the same polarity of the signal applied to the control grid 4 of amplifier 2. To reduce the signal supplied to amplifier 22 to the same value as that supplied to amplifier 2, resistor 12 has a value such that the amplification of amplifier 2 is equal to unity. Inductance 14 is a conventtional means, used in wide-band amplifiers, to obtain high-frequency compensation.

In the circuit of this invention, therefore, it is seen that the operating characteristics are identical for either output polarity, with respect to the input impedance, and with respect to the output signal voltage.

Having thus described the invention what is claimed is:

1. A polarity reversing circuit comprising a first beam power amplifier having a plate, a small resistor, a peaking inductance, and a large resistor connected in series in the plate circuit of said amplifier, a second beam power amplifier having a plate, a large resistor in the plate circuit of said second amplifier, means for connecting the output of the first amplifier to the input of the second amplifier, an output terminal, a first condenser having a low impedance to audio frequency currents, a second condenser having a low impedance to audio frequencies, said second condenser being connected to the output terminal, a two position switch connecting the second condenser to the plate of the first amplifier and the first condenser between the plate of the second amplifier and ground while in a first position, and connecting the second condenser to the plate of the second amplifier and the first condenser between the junction of said inductance and said large resistor while in a second position.

2. An apparatus for producing either polarity of received signals comprising a first amplifier having a plate impedance, a second amplifier, a first switch having two fixed contacts and a movable contact, one of said contacts being connected to the plate of the first amplifier and the other of said contacts being connected to the plate of the second amplifier, an output lead connected to movable contact, a second switch having two fixed contacts and a movable contact, one of said fixed contacts being connected to the plate of said second amplifier and the other of said fixed contacts being connected to an intermediate point in said plate impedance, a condenser connected between the movable contact of said second switch and ground, mechanical coupling between said switches such that the switches are connected with the plate of the second amplifier in alternate positions, and means for applying the output of said first amplifier to the input of the second amplifier.

3. A circuit for reversing the polarity of the output of wide band video amplifiers without affecting the frequency response characteristics comprising a first amplifier having a plate load impedance, a second amplifier, an output lead, a condenser, a switch for connecting the output lead to the plate of the first amplifier and the condenser to the plate of the second amplifier while in one position and for connecting the output lead to the plate of the second amplifier and the condenser to an intermediate point in said load impedance while in a second position, the output of said first amplifier being connected to the input of the second amplifier.

4. A circuit for reversing the polarity of video signals without affecting their frequency content or amplitude comprising in combination an output lead, a first amplifier, a second amplifier, switching means for shorting alternating current to ground from the plate of said second amplifier when the output lead is connected to said first amplifier, and means for equalizing the alternating current input and output of said first amplifier when the output lead is connected to said second amplifier, the output of the first amplifier being connected to the input of the second amplifier.

HOWARD L. MORRISON.

REFERENCES CITED

The following references are of record in the file of this patent:

UNITED STATES PATENTS

| Number | Name | Date |
|---|---|---|
| 1,396,745 | Haddock | Nov. 15, 1921 |
| 2,384,263 | Schlesinger | Sept. 4, 1945 |
| 2,419,546 | Grieg | Apr. 29, 1947 |